H. E. VAN DERHOEF
Aug. 1, 1933. FILM FORMING ELEMENT Re. 18,908
Original Filed Aug. 21, 1925
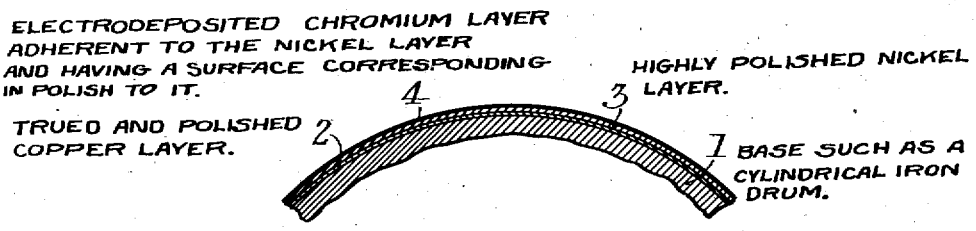
Henry E. Van Derhoef,
INVENTOR,
BY R. L. Stinchfield
ATTORNEY.

Reissued Aug. 1, 1933

Re. 18,908

UNITED STATES PATENT OFFICE 18,908

FILM FORMING ELEMENT

Henry E. Van Derhoef, Rochester, N. Y., assignor to Eastman Kodak Company, Rochester, N. Y., a Corporation of New York Original No. 1,746,751, dated February 11, 1930, Serial No. 51,640, August 21, 1925. Application for reissue February 9, 1932. Serial No. 591,887

8 Claims. (Cl. 18—15.)

This invention relates to an element having a chromium surface or facing upon which solutions or dopes of cellulosic esters or ethers may be flowed or deposited for the formation of a film, or which may be employed in the manufacture of high grade paper or any other purpose desired by those skilled in the art. One object is to provide a wear resisting element with a facing which will be hard and smooth and at the same time highly resistant to wear, even when exposed to prolonged wearing contact with sheet material. Another object of the invention is to provide an element with a smooth multilayer facing adapted to contact with sheet material and impart its smoothness to the latter or maintain smoothness which already exists therein, and yet maintain its own smoothness for prolonged periods or adapted for any other use requiring a smooth surface and long wear. Another object of the invention is to provide a film-making apparatus having a facing or surface which will be highly resistant to the intense and peculiar deteriorating forces which exist in the manufacture of films from cellulosic compositions. Still another object is to provide a film coating surface from which a deposited film of a cellulose ester or ether may be stripped with unusual facility. Another object of the invention is to provide a process for preparing an element with such a multilayer surface by electro-depositing a chromium layer upon a smooth nickel layer, the chromium layer deposit having a surface corresponding in smoothness to that of the nickel and yet adhering strongly to the surface of the nickel, the nickel layer in turn having been electrodeposited upon a copper layer which may be the base of the element or which may be a layer electrodeposited upon an iron base of the element. Other objects will hereinafter appear.

In the accompanying drawing, the single figure is a fragmentary sectional view of an element having my multilayer facing thereon, the parts being exaggerated in relative size for the sake of clearness.

In numerous industrial processes, sheet materials are formed or treated in such a way as to have smooth or highly polished surfaces. During the formation of the sheet materials, or during the treatment to perfect such surfaces, it is necessary for them to contact with supports. Usually these supports take the form of elements having endless surfaces, such, as drums or belts, which rotate in approximate synchronism with the movement of the material. It is essential that the surface of the support be so smooth or polished that it will not impair the smoothness of the polish of the sheet material. Moreover, it must keep this property over prolonged periods, and in spite of the fact that it is subjected to severe wearing forces by reason of its contact with the material.

Drums and belts having nickeled surfaces (or peripheries) of high polish have been employed, as for instance, in the drying of webs of smooth or glossy paper. But the tensions set up by the shrinking of the paper during drying cause the nickled surfaces to become worn too rapidly. I have found that the smoothness of the contacting surfaces of such supporting elements may be maintained over far greater periods than those heretofore obtained if the smooth nickel surface be covered with a layer of smooth electrodeposited chromium. The nickel should be smooth, and preferably highly polished. Then the layer of chromium will likewise be deposited with a corresponding smoothness, yet it will adhere to the nickel with a high degree of tenacity. It is an important feature of my invention that I can impart to the electrodeposited chromium a smoothness corresponding to that of the nickel and yet can make the layers adhere strongly in spite of the smoothness of the dividing surface between them. Of course, the outer surface of the chromium may be further polished or smoothed if desired.

Referring to the drawing, I have shown by way of example a fragmentary section of a cylindrical wheel or drum comprising a main body 1 having its outer surface finished to a cylindrical shape. The nickel coating is placed upon this. While it can be made in the form of a shell and shrunk directly upon the main body 1, I prefer to electrodeposit it, after placing upon the base 1 a preliminary intermediate thin layer of copper 2. This facilitates the union between the subsequently applied nickel and the iron body 1. After the copper is in position, it is carefully trued and polished to give a smooth cylindrical surface. Any of the well known methods for depositing copper on iron may be employed.

On the copper layer 2 is placed, preferably by electrodeposition, a nickel layer 3. This is done by any of the well known methods for applying it in strong lustrous adherent coatings, say from a nickel ammonium sulfate bath or other equivalent electrolyte. The outer surface of this nickel layer is very important in my process, as the quality of the eventual chromium surface depends so much upon it. It is carefully smoothed mechanically, such as by burnishing, buffing, etc. Of course, it can be trued by grinding, if necessary, but it generally follows the already true cylindrical surface of the copper layer 2. Its thickness is preferably sufficient to make it free from holes and imperfections and yet insufficient to form the nodules which sometime accompany thick plating. These conditions are understood by persons skilled in the electroplating of nickel.

The chromium layer 4 is then deposited upon the smooth polished surface of the nickel. If the latter is free from grease, or freed from grease by any of the grease-removing expedients used by electroplaters, the chromium layer, when electrodeposited thereon, will adhere to it with an unexpected and very useful tenacity. The electroplating method for the depositing of the chromium may be any of the known systems for accomplishing this purpose. I prefer, however, the process disclosed in the "Transactions of the American Electrochemical Society," vol. 37 (1920), pages 479 to 496 "Electrolytic chromium" by George J. Sargent. The bright chromium layer 3 thus obtained presents a smooth white appearance which may be sufficiently polished for most purposes without further mechanical treatment because its corresponds to the smoothness of the nickel layer 3. It may, however, be perfected by the usual polishing or buffing operations. While various thicknesses may be employed, I have found that thicknesses of the order of magnitude of one-half a thousandth of an inch are generally sufficient. When a chromium layer of this thickness is obtained, it has a notable hardness and freedom from defects. It is white and smooth, and is polished with the minimum of buffing.

Wheels and belts having my multilayer facing are highly resistant to the conditions to which the facings are subjected in Patent 1,466,733, Sulzer and Van Derhoef, September 4, 1923, apparatus for making sheets or film. In other words, they not only resist the shrinking and creeping wear when used as drums for handling paper, but likewise resist the tensified disintegrating forces which arise in the preparation of films, particularly from the dopes mentioned in the above cited patent. These disintegrating forces encountered in the production of film by deposition of a film-forming solution upon a surface for that purpose are many fold. Not only do cellulose nitrate dopes, and particularly cellulose acetate dopes, normally contain elements which are corrosive to metallic surfaces, but, I have found, the facility or lack of facility with which a film so formed can be stripped from the film forming surface is by no means to be predicted from experience with other materials. For instance, film was first produced by coating a solution thereof upon highly polished plate glass but many difficulties were encountered in stripping the film from the glass, the film sticking quite tenaciously to the glass until thoroughly freed of solvents and even then being difficult of removal except under proper humidity conditions. Although previous experience, therefore, with a highly polished quite hard surface, such as glass, indicated that it would be unsuitable for film coating purposes I discovered that a very smooth chromium surface (which is, of course, quite hard) is very suitable for the production of films by deposition of a dope thereon containing the cellulose derivative, such as cellulose nitrate, acetate or ether.

With such a chromium surface I found that the film need not be completely freed of solvents before removal (as in the case of a hard smooth glass surface) but that the film could be stripped from the chromium surface while the film was quite "green", i. e. while the film still contained a good portion of its solvents although having sufficient body to be handled. This also was not to be predicted by past experience with nickel or silver surfaces as such metals are quite soft when compared with chromium or glass.

While I refer hereinbefore to a multilayer facing of which chromium is the outer facing or surface it will be obvious that I may employ the chromium over any suitable supporting metal. As stated above, the nickel may be imposed directly upon the iron or steel support and the chromium upon the nickel, or the chromium may be imposed directly upon the iron or steel or other metallic support it being necessary only that the support have a polished surface, to which the chromium will properly adhere, in order that the chromium surface itself will not have to be buffed or polished too extensively. Also, while I have described a cylindrical or belt type of element as being most preferable, it will be obvious that a flat plate which has been chromium surfaced in accordance with my invention will suffice where it may be desired to produce only smaller sizes or areas of film. It will further be obvious that my invention may be utilized in the production of any other element where wear-resistance, and even ornamentation is desired, my multilayer coating giving increased wear resistance to almost any article upon which it may be employed, such as hardware, jewelry, reflectors, automobile parts, implements and the like.

Having thus described my invention, what I claim as new and desire to secure by Letters Patent is:

1. A cylindrical element for use in the manufacture of films from dopes containing cellulosic derivatives and having a hard smooth peripheral surface upon which film-forming dopes may be deposited and from which the films may be readily stripped, said surface comprising a supporting metallic backing, a polished nickel surface integrally united to a supporting backing and an outer layer of chromium, and said chromium layer being adherent to said polished nickel surface and possessing a corresponding polish which it imparts to a film formed thereon.

2. An element having a smooth hard surface upon which film-forming dopes containing cellulosic derivatives may be deposited and from which the film so formed may be readily stripped, said surface comprising a smooth hard facing of substantially pure chromium metal.

3. A film-forming element having a smooth hard surface upon which film-forming dopes containing cellulosic derivatives may be deposited and from which the film so formed may be readily stripped, said element comprising a supporting metallic backing, a polished nickel surface integrally united to the supporting backing and an outer facing of chromium, said chromium facing being adherent to said polished nickel surface and possessing a corresponding polish which it is capable of imparting to a film formed thereon.

4. The method of manufacturing cellulose derivative products and the like, comprising forming the cellulose-derivative material upon tools or implements having a chromium surface.

5. The method of manufacturing cellulose derivative products and the like comprising forming the cellulose-derivative material upon tools or implements having a chromium surface, said chromium surface being electrodeposited chromium.

6. The method of making articles containing nitro-cellulose which comprises producing a solution of the material of which the article is to be composed, contacting said solution with a chromium surface of proper shape to form the desired article and evaporating the solvent.

7. An article of manufacture comprising a ferrous foundation metal, a layer of copper electroplated thereon, an outer layer of chromium and a layer of nickel interposed between the layers of copper and chromium.

8. An article of manufacture comprising a ferrous foundation metal, a layer of copper deposited thereon, a layer of nickel deposited upon the copper layer and a layer of chromium deposited upon the nickel layer.

HENRY E. VAN DERHOEF.